US006338103B1

(12) United States Patent
Kirihata

(10) Patent No.: US 6,338,103 B1
(45) Date of Patent: Jan. 8, 2002

(54) SYSTEM FOR HIGH-SPEED DATA TRANSFER USING A SEQUENCE OF OVERLAPPED GLOBAL POINTER SIGNALS FOR GENERATING CORRESPONDING SEQUENCE OF NON-OVERLAPPED LOCAL POINTER SIGNALS

(75) Inventor: Toshiaki Kirihata, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/275,567

(22) Filed: Mar. 24, 1999

(51) Int. Cl.$^7$ .............................................. G06F 13/28
(52) U.S. Cl. ............................ 710/35; 710/33; 713/500
(58) Field of Search ........................ 710/33, 35, 58–61; 713/500, 600; 327/24, 26, 31

(56) References Cited

U.S. PATENT DOCUMENTS

| 4,412,335 | A |   | 10/1983 | Froment et al. |         |
|-----------|---|---|---------|----------------|---------|
| 4,670,672 | A |   | 6/1987  | Ando et al.    |         |
| 4,760,291 | A |   | 7/1988  | Nakajima et al.|         |
| 5,003,194 | A |   | 3/1991  | Engelhard      |         |
| 5,173,618 | A | * | 12/1992 | Eisenstadt     | 327/239 |
| 5,218,237 | A |   | 6/1993  | Mao            |         |
| 5,389,831 | A | * | 2/1995  | Eisenstadt     | 327/161 |
| 5,517,136 | A |   | 5/1996  | Harris et al.  |         |
| 5,517,638 | A | * | 5/1996  | Szczepanek     | 713/401 |
| 5,748,806 | A | * | 5/1998  | Gates          | 710/126 |
| 5,828,659 | A | * | 10/1998 | Teder et al.   | 370/328 |
| 6,173,190 | B1| * | 1/2001  | Usui           | 455/562 |
| 6,182,183 | B1| * | 1/2001  | Winghard et al.| 710/129 |

* cited by examiner

Primary Examiner—Thomas Lee
Assistant Examiner—Thuan Du
(74) Attorney, Agent, or Firm—Scully, Scott, Murphy & Presser; H. Daniel Schnurmann

(57) ABSTRACT

A circuit architecture and methodology for providing burst data transfer in high-speed digital circuit applications implements a sequence of overlapped global-pointer signals for generating corresponding sequence of non-overlapped local-pointer signals. One of the global pointer signals starts to be activated per cycle and the pulse width of each global pointer signal is greater than the burst cycle time. A global pointer signal <i> of a sequence (where i is one of the integers <1:n>) is used to generate a corresponding local pointer signal <i> that is reset by detecting a time at which the global pointer signal <i+1> starts to be activated. This allows for generation of reliable non-overlapped local pointer signals, while using overlapped global pointer signals. Each local generated pointer signal is used to accomplish a respective data transfer, e.g., from an individual latch to a single data line.

19 Claims, 3 Drawing Sheets

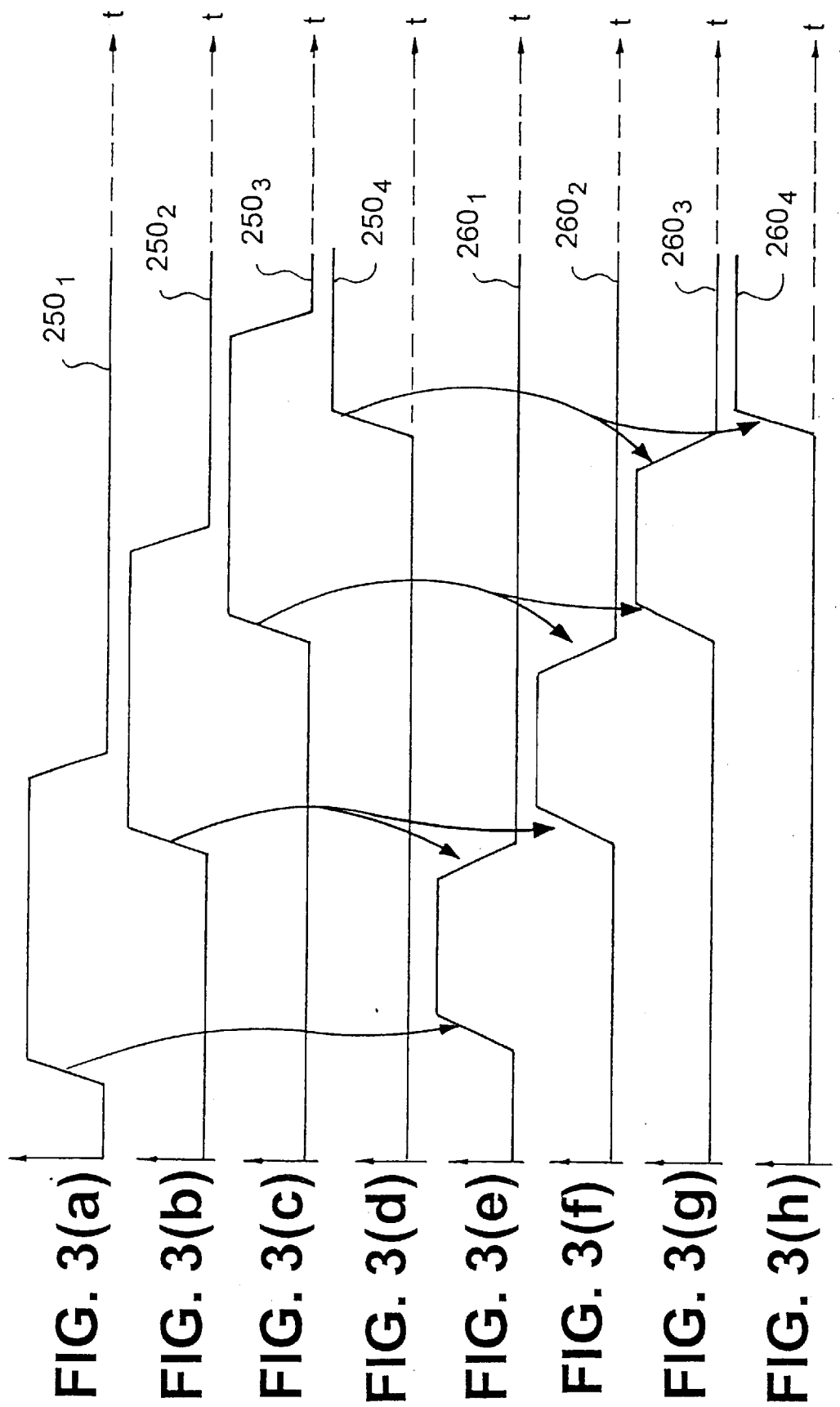

SYSTEM FOR HIGH-SPEED DATA TRANSFER USING A SEQUENCE OF OVERLAPPED GLOBAL POINTER SIGNALS FOR GENERATING CORRESPONDING SEQUENCE OF NON-OVERLAPPED LOCAL POINTER SIGNALS

BACKGROUND OF THE INVENTION

1. Field of the Invention

The present invention relates generally to the field of computer systems having dynamic memory data storage and, more particularly, to a method and circuit architecture implementing pointers for enabling high-speed burst data transfer for computer and computing system applications.

2. Discussion of the Prior Art

With rapid improvements in computer processor performance, it is not only highly desirable to have main memories with high-density, but also with higher data rates. For example, with ever-increasing system clock rates of the state-of-the-art microprocessors, high band-width DRAM's are required in order to avoid wait states without adding to the complexity of memory hierarchy, e.g., such as when implementing SRAM cache. Prefetch architectures can effectively boost the burst frequency of the DRAM data rates. For example, a "2b" prefetch architecture has been introduced for synchronous DRAM (SDRAM) to boost the data-rate to 200%. It readily follows that a "4b" prefetch architecture may be used for the double data rate (DDR) SDRAM to boost the data-rate to 400%. An "8b" prefetch architecture is already used for the Rambus DRAM (RDRAM), realizing data rates of up to 800%.

Regardless of any prefetch architecture, a frequency conversion is required, for example, by multiplexing a plurality of data signals on a bus with slow speed for storage thereof at corresponding registers during a prefetch operation, and then reading the latched data signal sequentially from the registers to a shared bus at a high speed. A typical example of this frequency conversion is the first in first out (FIFO) circuitary comprising a plurality of registers, input pointers, and output pointers. A key design factor in FIFO circuitry is how to fetch the input data to the registers with input pointers and output the data from the registers with output pointers. Thus, there is a strong and potential requirement to design pointers for use in prefetching architecture, in particular FIFO circuitry.

FIG. 1 illustrates a typical pointer design, where the data on four registers 101–104 are transferred to one data output bus 110 in burst mode, e.g., four bit burst mode. Such burst data transfer assumes pre-fetch has taken place, i.e., the latches or registers 101–104 comprise the data, for e.g., input simultaneously at a first cycle time, e.g., 10 nsec. The burst transfer is realized by sequentially activating one of the four pointer signals 112a, . . . , 112d. The problems of this prior art design are: 1) overlapping of two pointer signals causes a data contention on data output bus 110; 2) insufficient pointer signal pulse width cannot drive the data output bus 110, which may cause a functionality problem; and 3) it is difficult to globally transfer a small pulse width pointer signal, since the signal pulse may be severely degraded, modified, or even disappear due to the circuit wiring which acts as an RC low pass filter.

Overcoming these problems are more difficult as the burst data frequency is increased to speeds currently achievable, e.g., 2.5 nsec for 400 Mb/sec with 200 MHZ DDR operation.

It would thus be highly desirable to provide an improved circuit architecture implementing pointer signals that enable high-speed burst data transfer of digital signals from a plurality of drivers onto a data bus sequentially, in a simple and efficient manner.

SUMMARY OF THE INVENTION

It is an object of the present invention to provide a circuit architecture and circuit control methodology implementing high-speed burst mode data transfer, in a manner so as to avoid the aforementioned problems.

It is a further object of the present invention to provide a digital circuit architecture that implements overlapped "global-pointer" signals for generating non-overlapped "local-pointer" signals that enable the high-speed, sequential burst data transfer from a plurality of sources to a single data line in a simple and efficient manner.

It is a further object of the present invention to provide a control methodology for enabling generation of overlapped global and non-overlapped local pointer control signals for enabling high-speed, sequential burst data transfer from a plurality of sources to a single data bus in a simple and efficient manner. According to the principles of the invention, there is provided a circuit architecture and methodology for providing increased burst data transfer in high-speed digital circuit applications that implements a sequence of overlapped global-pointer signals for generating a corresponding sequence of non-overlapped local-pointer signals. One of the global pointer signals is activated per cycle and the pulse width of each global pointer signal is greater than the cycle time. A global pointer signal $<i>$ of a sequence (where i is one of the integers $<1:n>$) generates a corresponding local pointer signal $<i>$ that is reset by detecting a time at which the next successive global pointer signal $<i+1>$ starts to be activated. This allows for generation of reliable non-overlapped local pointer signals, while using overlapped global pointer signals.

Advantageously, the invention is suited for multitasking computing system architectures implementing dynamic RAM and is capable of achieving data transfer rates of, e.g., 800 Mbits/sec/pin (corresponding to 400 MHZ system cycle) or greater, utilizing double-data synchronous or Rambus DRAM architectures with 8b prefetch or beyond.

BRIEF DESCRIPTION OF THE DRAWINGS

Further features, aspects and advantages of the apparatus and methods of the present invention will become better understood with regard to the following description, appended claims, and accompanying drawings where:

FIGS. 3(a)–3(d) illustrates the timing relationship of respective overlapping global pointer signals.

FIGS. 3(e)–3(h) illustrates the timing relationship of respective non-overlapped local pointer signals used for triggering burst data transfer.

DETAILED DESCRIPTION OF THE INVENTION

The invention is a circuit architecture and methodology for providing burst data transfer in high-speed digital circuit applications that addresses the following three concepts: 1) providing overlapping global-pointer signal to overcome the potential problem of small pulse width signal degradation due to RC low pass filter effects; 2) locally generating non-overlapped local-pointer for avoiding output data bus contention; and 3) ensuring that the pulse width of the non-overlapped local pointer signals is commensurate with the system cycle time to ensure sufficient bus driving capability. Preferably, the pulse width is the exact time of the cycle time, so that pointer overlap is avoided, while maximizing the pulse width.

Figure 1:
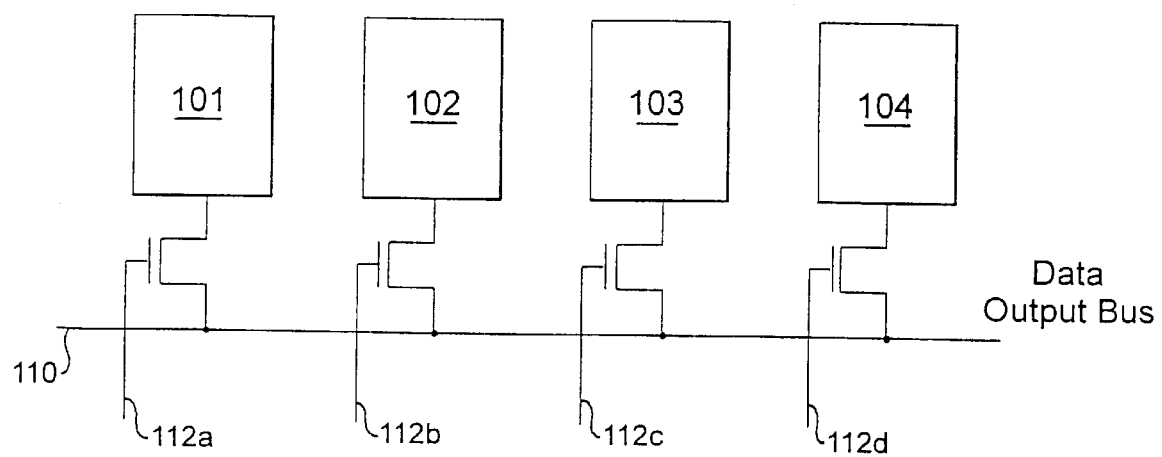
FIG. 1 illustrates a digital burst data transfer circuit implementing local pointers according to the prior art.
Figure 2:
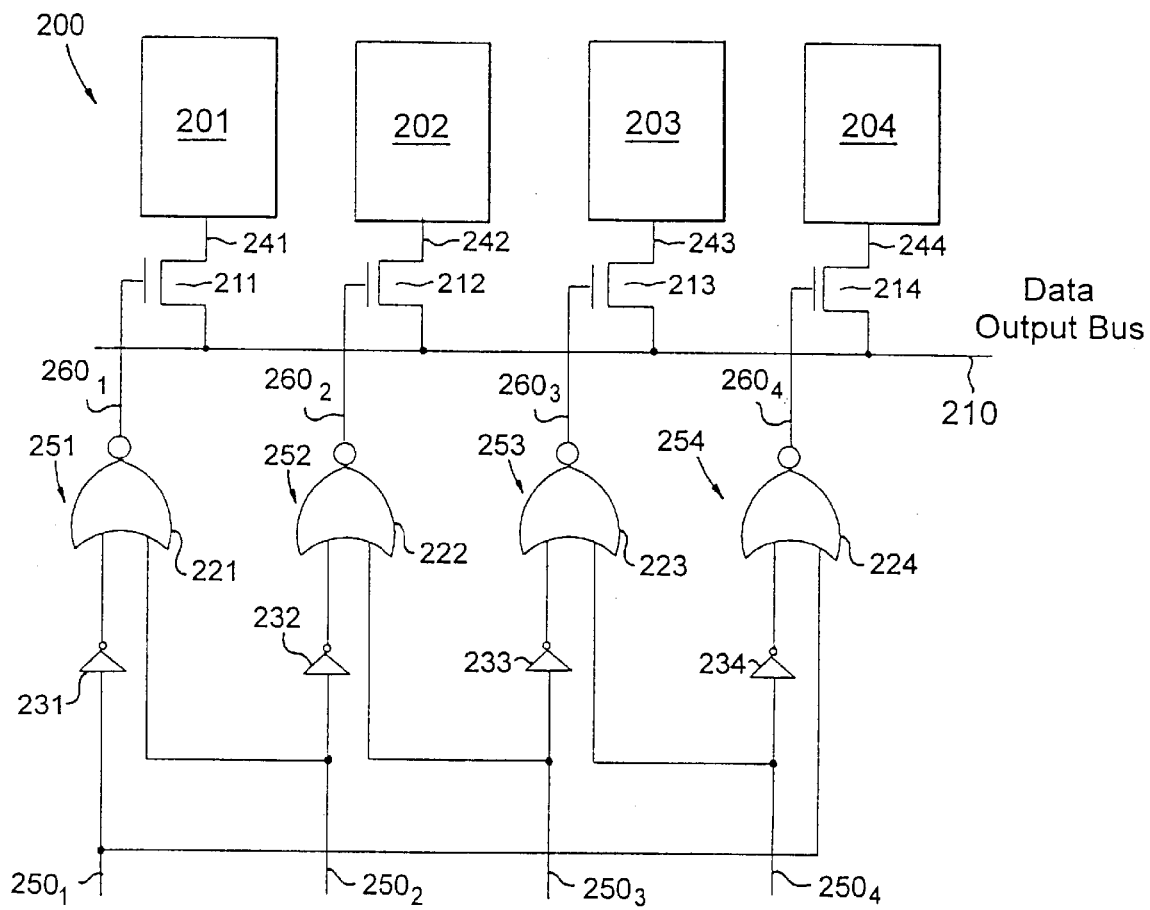
FIG. 2 illustrates the high-speed digital burst data transfer circuit of the invention implementing global pointer signal, local pointer signal, and self-resetting pulse generator functionality.

FIG. 2 shows the overlapped global pointer signal architecture 200 of the invention, which allows a burst data transfer, for example, four bits (4b) from respective data latch registers 201–204 to one single-line data bus 210 as a 4b burst mode. Specifically, each register 201, . . . , 204 includes a respective coupling device, e.g., NMOS (N-FET) transistors 211, . . . , 214 that are responsive to respective locally generated pointer signal $260_1$, . . . , $260_4$ for respectively driving a respective data register output signal 241, . . . , 244 onto the data bus 210. Optionally, the NMOSs may be replaced with tri-state buffers, as is well known in the art. Preferably, each local pointer signal is non-overlapped and of a duration sufficient for driving the output bus.

Additionally, according to the invention as shown in FIG. 2, sequentially generated overlapped global pointer signals $250_1$, . . . , $250_4$ are input to respective pulse converter circuits 251, . . . , 254 comprising respective logic gates, e.g., NOR gates 221, . . . , 224, and respective inverter devices 231, . . . , 234, for generating respective local pointer signals $260_1$, . . . , $260_4$ of smaller non-overlapping pulse width in the manner as hereinafter described.

Referring now to FIGS. 3(a)–3(d), the sequential generation and overlapped timing relation of respective global signals $250_1$, . . . , $250_4$ is illustrated. Utilizing current dynamic RAM technologies, global pointer signals may be generated at a system rate of 200 MHZ, if a global pointer signal pulse width is greater than 5 nsec, requiring overlapped global pointer transfer. As shown in FIG. 2, the first global pointer signal $250_1$ is inverted by inverter device 231 and input to a first input of NOR gate 221 for initiating generation of a first non-overlapped local pointer signal $260_1$ at the output as shown in FIG. 3(e). The next generated global pointer sign $250_2$, as shown in FIG. 3(b), is simultaneously input to the second input of NOR gate 221 and first input of respective second NOR gate 222 (inverted by inverter device 232) for generating second local pointer signal $260_2$ at the output. In response to the rising edge of the next global pointer signal $250_2$, the first local pointer signal $260_1$ is disabled as shown in FIG. 3(e) Note that the pulse width of the local pointer $260_1$ is equal to the time between the rising edge of the global pointer $250_1$, and the global pointer $250_2$. Likewise, as shown in FIG. 2, the next generated global pointer signal $250_3$, as shown in FIG. 3(c), is simultaneously input to the second input of NOR gate 222 and the respective first input of the next NOR gate 223 (inverted by inverter device 233) for generating respective third non-overlapped local pointer signal $260_3$. In response to the rising edge of the global pointer signal $250_3$, the second local pointer signal $260_2$ is disabled as shown in FIG. 3(f). Furthermore, as shown in FIG. 2, the next generated global pointer signal $250_4$ is simultaneously input to the second input of NOR gate 223 and the respective first input of the next NOR gate 224 (inverted by inverter device 234) for generating respective fourth non-overlapped local pointer signal $260_4$. In response to the rising edge of the next global pointer signal $260_4$, the third local pointer signal $260_3$ is disabled as shown in FIG. 3(g). Finally, in FIG. 2, the next generated global pointer signal is the first global pointer signal $250_1$ and is activated at the second input of the NOR gate 224 to disable the fourth local pointer signal $260_4$ as shown in FIG. 3(h). As an example, according to the invention, when implementing a 4-bit burst data transfer and assuming a 10 nsec prefetch, the four-bit burst data transfer would be accomplished in 2.5 nsec, with four local pointer signals being sequentially generated each having a local pulse width of 2.5 nsec (400 Mb/sec with 200 MHZ DDR operation).

It is understood that in the embodiment shown in FIG. 2, the sequence of the global pointer signal activation is from one (1) to four (4) and may be repeated, if necessary. It should be understood however, that the principles of the invention may be readily be applied for achieving 8-bit, 16-bit, or 32-bit burst data transfer at high-speed, and is not limited to four bits, as shown and described with respect to FIG. 2. Note that next global pointer signal starts to be activated before the previous global pointer signal is disabled in order to allow a wide global pointer signal pulse width transfer. For simplicity, the pulse width of the global pointer signal is assumed to be less than two (2) burst cycles, however, the invention is not limited to this configuration. Thus, when the first signal global pointer signal <1> is activated, the corresponding local pointer signal <1> goes high, coupling the register 201 to the data output bus through NMOS transistor 211. When the global pointer signal <2> is activated, local pointer signal <1> is disabled, disconnecting the register 201 to the data output bus. On the other hand, the register 202 is coupled to the data output bus 210 through the register 202 is coupled to the data output bus 210 through the NMOS transistor 212. When the global pointer signal <3> is activated, local pointer signal <2> is disabled, disconnecting the register 202 to the data output bus. On the other hand, the register 203 is coupled to the data output bus 210 through the NMOS transistor 213. When the global pointer signal <4> is activated, local pointer signal <3> is disabled, disconnecting the register 203 to the data output bus. On the other hand, the register 204 is coupled to the data output bus 210 through the NMOS transistor 214.

This architecture is simple and effective, and advantageous for high-frequency VLSI designs and dynamic RAM architectures, e.g., utilizing double-data synchronous or RAM bus DRAM data transfer methods. Thus, for example, assuming a 4-bit data pre-fetch accomplished in 10 nsec, each of four data bits may be transferred at 2.5 nsec (using double-data rate of 100 MHZ), as enabled by the local pointers of the invention. Although the invention is discussed for chip design, however, the logic employed herein may be used for system, e.g., PC, workstation, etc., or even for software controlled applications.

While the invention has been particularly shown and described with respect to illustrative and preformed embodiments thereof, it will be understood by those skilled in the art that the foregoing and other changes in form and detail may be made therein without departing from the spirit and scope of the invention which should be limited only by the scope of the appended claims. For instance, although the embodiment shown and described with respect to FIG. 2 implements NOR logic gates 221, . . . , 224, corresponding inverter devices 231, . . . , 234 at respective first inputs thereof, and NMOS coupling transistors 211, . . . , 214, it is understood that other logic devices may be readily substituted.

Having thus described our invention, what we claim as new, and desire to secure by the Letters:

1. A burst data transfer device implementing global pointer architecture comprising:

one or more data transfer devices for enabling local transfer of data signals to an output device;

global pointer signal generator for successively generating one or more global pointer signals, each successively generated global pointer signal overlapping in time with a prior generated global pointer signal;

local pointer generator means associated with a data transfer device and responsive to a corresponding global pointer signal for generating a respective local pointer signal for triggering a respective local data transfer at a system cycle, whereby each said local pointer signal of a sequence is non-overlapping with a successive generated local pointer signal.

2. The device as claimed in claim 1, wherein said local pointer generator means comprises a logic gate device having a first input for receiving a global pointer signal, and a second input receiving a next successive overlapped global pointer signal, each gate device generating a successive local pointer at said system clock cycle.

3. The device as claimed in claim 2, wherein said each global pointer signal comprises a pulse of pulse width greater than a burst cycle time.

4. The device as claimed in claim 1, wherein a next successive global pointer signal corresponding to a last transfer device is equal to a global pointer signal corresponding to first gate device of said sequence.

5. The device as claimed in claim 3, wherein a rising pulse edge of said global pointer signal at a first input to a logic gate device enables generation of a corresponding local pointer signal at an output of said gate device.

6. The device as claimed in claim 5, wherein a rising pulse edge of said global pointer signal at a second input to a logic gate device disables said local pointer signal at an output of said gate device.

7. The device as claimed in claim 2, wherein said logic gate device comprises a NOR gate.

8. The device as claimed in claim 2, wherein said output device is a single data bus for transferring said burst data.

9. The device as claimed in claim 8, wherein each data transfer device includes corresponding coupling means responsive to said local pointer signal for transferring said data onto said data bus.

10. The device as claimed in claim 9, wherein said coupling means includes bus driving element for driving said data bus.

11. The device as claimed in claim 3, wherein said pulse width for said global pointer signal is less than two burst cycles.

12. A method for burst transfer of data from a plurality of local data transfer devices to a single output device comprising the steps of:

a) generating sequence of global pointer signals, each successively generated global pointer signal overlapping in time with a prior generated global pointer signal and, a global pointer signal (i) being input to a respective first input of an associated logic device (i);

b) providing a next successive overlapped global pointer signal (i+1) at a second input of a logic device associated with an immediate prior generated global pointer signal (i); each said logic device generating a respective local pointer signal (i) at an output thereof based on said overlapping global pointer signal (i) and global pointer signal (i+1), said respective local pointer signal for triggering a local data transfer device at a system cycle, whereby each said generated local pointer signal forms a non-overlapping sequence enabling said burst data transfer at said system cycle.

13. The method as claimed in claim 12, wherein said each global pointer signal comprises a pulse of pulse width greater than a burst cycle time.

14. The method as claimed in claim 12, wherein a final successive global pointer signal at a second input of a last logic device is equal to a first global pointer signal of said sequence.

15. The method as claimed in claim 12, wherein said respective local pointer signal is a pulse signal at an output of each logic device, said step of generating a respective local pointer signal at an output of each logic device includes detecting a pulse signal edge of a global pointer signal (i) at a first input of said logic device and, detecting a pulse edge of a successive global pointer signal (i+1) at a second input of said logic device.

16. The method as claimed in claim 15, wherein said step of triggering a local data transfer device at a system cycle includes activating a coupling means in response to a said local pointer signal for coupling data from a local transfer device to said single output device.

17. The method as claimed in claim 16, wherein said coupling means includes bus driving element for driving said data bus.

18. The method as claimed in claim 16, wherein said single output device includes a single data bus.

19. The method as claimed in claim 13, wherein said pulse width for said global pointer signal is less than two burst cycles.

* * * * *